United States Patent [19]

Uba et al.

[11] Patent Number: 4,648,177
[45] Date of Patent: Mar. 10, 1987

[54] METHOD FOR PRODUCING A SEALED LEAD-ACID CELL

[75] Inventors: Toshio Uba, Lakewood; Robert F. Nelson, Aurora, both of Colo.

[73] Assignee: Gates Energy Products, Inc., Denver, Colo.

[21] Appl. No.: 544,333

[22] Filed: Oct. 21, 1983

[51] Int. Cl.$^4$ .................................... H01M 10/12
[52] U.S. Cl. .................................... 29/623.2; 429/57; 429/94; 429/225; 429/247; 204/2.1
[58] Field of Search ............ 429/57, 94, 60, 225, 429/247, 204, 55, 54, 252; 29/623.1, 623.2; 204/2.1

[56] References Cited

U.S. PATENT DOCUMENTS

| | | |
|---|---|---|
| 3,862,861 | 1/1975 | McClelland et al. ............ 429/252 X |
| 4,216,280 | 8/1980 | Kono et al. ..................... 429/247 |
| 4,414,295 | 11/1983 | Uba .................................. 429/59 |
| 4,421,832 | 12/1983 | Uba .................................. 429/72 |
| 4,465,748 | 8/1984 | Harris ............................. 429/247 |

Primary Examiner—Anthony Skapars
Attorney, Agent, or Firm—C. H. Castleman, Jr.; H. W. Oberg, Jr.; Frank P. Grassler

[57] ABSTRACT

A sealed gas recombining lead-acid cell with absorbed electrolyte is produced by assembling unformed plates and high porosity glass mat separator whose surface area is from 0.2–1.7 m²/g, adding a limited quantity of acid into the cell, and then either prior to or after sealing of the cell electrochemically forming the plates of the cell in situ. High rate performance of the cell is significantly improved over cells using conventional high surface area glass separators.

17 Claims, 3 Drawing Figures

```
┌─────────────────────────────────────────────┐
│  ASSEMBLE CELL STACK OF UNFORMED LEAD-      │
│  CONTAINING PLATES & HIGHLY POROUS MICROFINE│
│  GLASS FIBER SEPARATOR HAVING A SURFACE AREA│
│  OF 0.2 – 1.7 m²/g.                         │
└─────────────────────────────────────────────┘
                      ↓
┌─────────────────────────────────────────────┐
│  INSERT THE CELL STACK INTO A CONTAINER SO  │
│  THAT THE PLATES & SEPARATOR ARE MUTUALLY   │
│  COMPRESSED TOGETHER.                       │
└─────────────────────────────────────────────┘
                      ↓
┌─────────────────────────────────────────────┐
│  METER CONTROLLED QUANTITY OF ACID ELECT-   │
│  ROLYTE INTO CELL SO THAT THE ELECTROLYTE IS│
│  SUBSTANTIALLY FULLY ABSORBED IN THE SEPARA-│
│  TOR & PLATES.                              │
└─────────────────────────────────────────────┘
                      ↓
┌─────────────────────────────────────────────┐
│  ELECTROCHEMICALLY FORM PLATES OF CELL IN   │
│  SITU PRIOR TO OR AFTER SEALING A LID TO CON│
│  TAINER, WHEREBY INDIVIDUAL PORE VOLUMES OF │
│  PLATES & SEPARATOR ARE LESS THAN FULLY     │
│  FILLED WITH ELECTROLYTE.                   │
└─────────────────────────────────────────────┘
```

FIG. 1

METHOD FOR PRODUCING A SEALED
LEAD-ACID CELL

BACKGROUND OF THE INVENTION

This invention relates to maintenance-free rechargeable sealed lead-acid cells (batteries) of the absorbed electrolyte type and in particular to a method for producing such batteries using in situ electrochemical formation of the electrode plates.

The basic sealed gas recombining lead-acid battery of the absorbed electrolyte type is taught in McClelland et al U.S. Pat. No. 3,862,861. That patent teaches the preferred use of a separator material made from microfiber glass matting highly absorptive of the electrolyte. The fiber diameter of the glass is taught to be in the range of 0.2 to 10 microns, with a surface area of approximately 0.1 to 20 $m^2/g$ of silica and a porosity as high as 85–95 percent. In commercial practice batteries of this type have employed ultrafine glass fiber nonwoven mats composed of different fiber diameter components, with a corresponding surface area in the range of 2.0–2.4 $m^2/g$. Typical separator materials of this type are illustrated in published U.K. Patent Application No. 2051464A (see scanning electron photomicrographs of FIGS. 3 and 4). Sealed recombining batteries of this type in both parallel plate prismatic and spiral wound configurations have enjoyed considerable commercial success.

Two basic methods have typically been used to electrochemically form the plates of sealed gas recombining lead-acid batteries. During the formation step typically the lead sulfate and lead oxide in the positive plate are oxidized to form lead dioxide, and in the negative plate the lead sulfate and lead oxide are reduced to spongy lead. In the first method which is typically used to form flat plates for stacking into prismatic configurations, the plates are pre-formed e.g., tank formed, subsequently assembled with interleaved ultrafine glass fiber mats of the aforementioned type, inserted into a container with the plates and separators compressed together, and then electrolyte is added and the batteries sealed.

In the second method, such as is disclosed in the aforementioned McClelland et al patent, unformed plates are assembled with interleaved highly absorbent separators, inserted into the container with the plates and separators existing under mutual compression, electrolyte is then added, and then the plates are electrochemically formed in situ. The formation electrolyte also serves as the final electrolyte. This method is particularly useful for producing cells having plates of continuous lengths wound or folded together. For instance, it is not considered possible to wind pre-formed active lead plates into a spirally wound configuration since the plates are stiff, will crack and otherwise lose their integrity upon winding.

Non-sealed lead-acid batteries have also been formed by the above methods and also by a fill and dump method. In this latter method the plates with interposed separator are formed in the container using low specific gravity acid which is subsequently dumped and replaced with higher gravity acid.

All commercial sealed recombining cells made by the in situ formation process have, to Applicants' knowledge, employed microfine glass fiber mat separators with a surface area in the range from 2.0–2.4 $m^2/g$, and a porosity in the range of about 85 to about 95 percent. This high void volume and high surface make it possible for the separator to absorb relatively large amounts of acid while still retaining a substantial void volume sufficient for oxygen to be transported from the positive to the negative electrode plates during overcharge where it is recombined. However, because of this large separator surface area and high affinity of the glass for sulfuric acid, it has been difficult particularly in cells having extended width plates to obtain a cell where acid is distributed evenly over the total separator volume, and where an adequate proportion of the acid is partitioned into the plates. The relatively low acid level within the plates retards the high-rate performance of the cells (where capacity is limited by the amount of acid within the pores of the active material). Uneven distribution of acid within the separator envelope creates areas in the cell where the specific gravity of the electrolyte is low, or where dry bands are formed, and normally low corrosion rates are greatly accelerated.

Additional relevant art includes copending commonly assigned application U.S. Ser. No. 375,503, filed May 6, 1982, now U.S. Pat. No. 4,414,295, and aforementioned U.K. Patent Application No. GB2051464A published Jan. 14, 1981.

The present invention has as its primary object the provision of a sealed recombining lead-acid battery, produced using an in situ formation process and having improved high rate performance particularly at low temperatures, without compromising oxygen recombination efficiency upon charge of the battery. It is another object to produce the aforementioned battery by a method in which the separator component is chosen to produce a more homogeneous distribution of electrolyte through the total separator volume, and a more favorable partitioning of the electrolyte between the separators and plates pressed thereagainst, to enhance the formation process and subsequent performance of the battery.

SUMMARY OF THE INVENTION

In one aspect the invention comprehends a method for producing a normally sealed gas recombining lead-acid electrochemical cell having absorbed electrolyte, including the steps of (a) assembling a cell stack of electrochemically unformed lead-containing plates and interleaved highly porous microfine glass fiber mat separator having a specific surface area of from about 0.2 to about 1.7 $m^2/g$; (b) inserting the cell stack into a container so that the unformed plates and separator are mutually pressed together; (c) metering a controlled quantity of liquid acid electrolyte into the cell so that the electrolyte is substantially fully absorbed in the pores of the plates and separator; (d) electrochemically forming the plates of the cell in situ, whereby individual pore volumes of the plates and separator are less than fully filled with electrolyte; and prior to or after this forming step (e) sealing the cell.

In another aspect, the invention is directed to a normally sealed gas recombining lead-acid cell having a high rate discharge capability utilizing an "oxygen cycle" including a container; at least one porous positive plate and at least one porous negative plate within the container, both plates having been electrochemically formed in situ in the container; a separator material interleaved between and in firm pressure contact with the plates, comprised of a mat of microfine glass fibers having a specific surface area of from about 0.2 to about 1.7 $m^2/g$ and a porosity of from about 70 to about 95 percent; and liquid sulfuric acid electrolyte substantially fully absorbed within the pores of the plates and separator, the quantity of electrolyte being limited such that the pore volumes of the plates and the separator are less than fully filled.

BRIEF DESCRIPTION OF THE DRAWINGS

The invention will be more particularly described in certain of its preferred embodiments in conjunction with the accompanying drawings, in which like numerals designate like parts, and in which:

FIG. 1 is a flow chart of the principal constituent steps of the method of the invention;

PREFERRED EMBODIMENTS OF THE INVENTION

Figure 2:
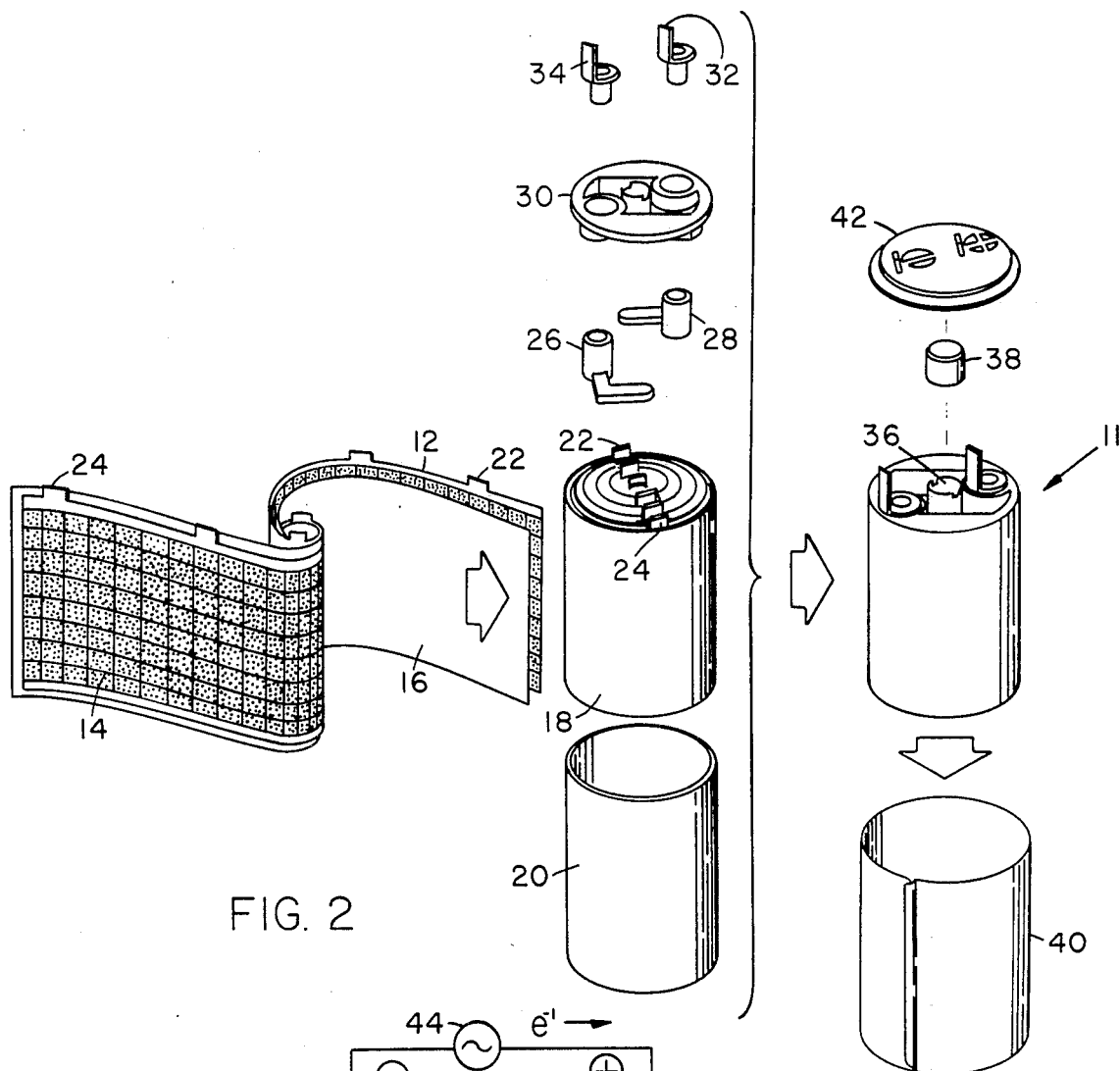
FIG. 2 is a perspective, exploded view schematically illustrating the constituents of a sealed cell in accordance with the invention, and the steps of assembling those constituent elements.

The sealed cell and method of the invention will be described in respect to the production of a spirally wound single electrochemical cell, however the invention broadly applies to the production of single or multi-cell batteries in which the plates are electrochemically formed in situ. The invention is applicable to any desired cell or battery configuration such as parallel plate prismatic, however the method of the invention is most advantageously applied to the production of batteries employing continuous plate lengths which are wound, folded accordian style, or in some other fashion formed into a cell stack of desired configuration.

Referring now to the drawings the cell or battery element shown generally at 10 is generally constructed in accordance with the invention detailed in U.S. Pat. No. 3,862,861, which is hereby incorporated by reference. Thus, the materials and arrangement of cell components are chosen to provide a battery capable of discharge and charge (including overcharge) in any indiscriminate attitude without electrolyte loss, and with the ability to recombine oxygen using the "oxygen cycle" at high rates of efficiency (e.g., above about 99 percent at a minimum C/20 overcharge rate).

Cell 10 may be constructed by spirally winding together under tension flexible unformed positive plate 12 and flexible unformed negative plate 14 with interleaved porous glass fiber separator 16 having specific characteristics, discussed more fully hereinafter, into a self-supporting roll 18 dimensioned to form a more or less snug fit within inner liner container 20 formed of polypropylene or other suitable acid resistant material.

Figure 3:
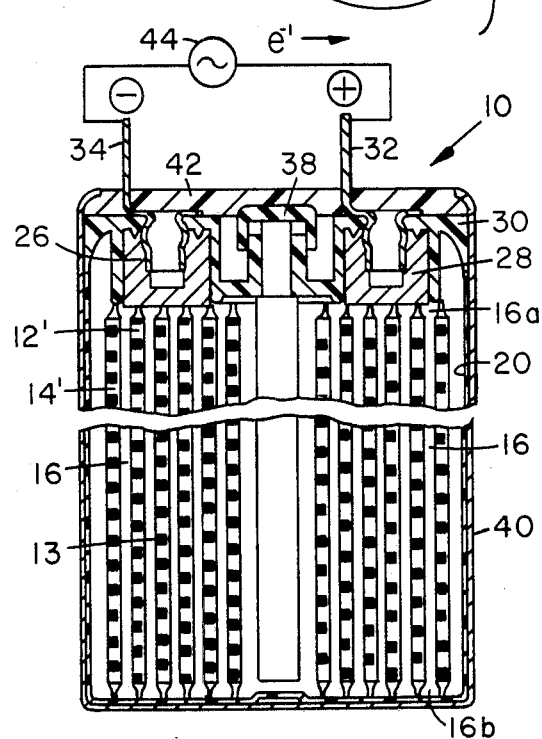
FIG. 3 is an elevational cross-sectional view of the sealed cell of FIG. 2.

The unformed positive plate 12 is made by pasting an electrochemically active lead-containing material onto a grid 13, shown (enlarged) in cross section in FIG. 3. A high density material of substantially 75 percent by weight of litharge (PbO) and 25 percent of red lead ($Pb_3O_4$), together with any added components such as bulking agents or binders, may be used. Sufficient water is added to the mixture to obtain a paste having a density of approximately 3.6 to about 4.8 grams of paste per cubic centimeter of mixture. A sulfated, lower density paste may also be used with advantage, as dictated by the desired properties.

The unformed negative plate 14 is made in a similar fashion; however, the paste is either formed as a high density material composed for instance of 100 percent litharge in addition to the normal expander and binder together with water to yield a paste density of about 4.0 to about 4.8 grams per cubic centimeter, or more preferably for high rate performance a sulfated paste of relatively lower density, formed preferably of leady oxide (litharge plus about 20–30 percent free lead particles) together with expander and an aqueous solution of sulfuric acid.

Both plates are formed by pasting grids 13 with such active materials. The grids may be made of cast or wrought lead, for instance, formed into a perforated sheet as shown, or expanded mesh. Continuous direct cast grids may also be used. The lead used for the grid preferably has a high hydrogen overvoltage and is preferably pure lead of at least 99.9 percent by weight purity, with the impurities not serving to substantially reduce the hydrogen overvoltage especially in the negative plate, or an alloy of lead naturally having a high hydrogen overvoltage, such as lead/calcium, lead/calcium/tin, or the like. High purity lead offers the additional advantages of low corrosion rate and pliability to facilitate winding or folding. The grid may also be formed of composites of plastic materials with lead or other conductive matter for weight reduction. Preferably the grids are provided with integral collector tabs 22, 24.

The active paste materials may be applied to the respective grids in any normal manner, such as by the process taught in Ching et al U.S. Pat. No. 4,050,482. The resultant opposite polarity pasted plates 12, 14 and interleaved special separator 16 are then spirally wound into a cylindrical element in known manner with opposite polarity collector tabs 22, 24 lining up on opposite sides of the open end of the wound element. The wound element is then dried.

At this point lead post connectors 26, 28 are welded to the exposed opposite polarity tabs 22, 24 and are positioned in bosses provided in the inner lid 30 to house through-the-wall connectors to link in sealed fashion posts 26, 28 respectively with output terminals 32, 34. After the terminals are sealed in known manner by expansion into the lead posts, the spiral element and partial top assembly are then stuffed into liner 20 and the top and liner are bonded together. The inner liner container 20 serves to constrain the plates and separators and maintain the mutual compression therebetween.

At this stage of assembly shown generally at 11 in FIG. 2, the cell is sealed except for the open vent hole 36 which communicates with the interior of the cell. A controlled quantity of liquid sulfuric acid electrolyte of desired density, e.g., 1.28–1.34 s.g., is now metered into the cell via vent holes 36 such that the electrolyte is substantially fully absorbed within the pore volume of the separator 16 and plates 12, 14. There is substantially no free unabsorbed electrolyte in the cell. Preferably from about 4.2 to about 5.8, more preferably from about 4.7 to about 5.2 grams of sulfuric acid are added (irrespective of acid concentration of the electrolyte) per ampere-hour of capacity of the cell. As an example, 10–13 grams of 1.335 s.g. sulfuric acid (43 percent concentration) may be used, per ampere hour capacity. Addition of electrolyte is preferably done under vacuum so that air is exhausted from the cell. The electrolyte will be absorbed into the plates/separator cell pack normally from either longitudinal end of the cell pack. That is, electrolyte will be absorbed into the extended portions 16a and 16b, respectively of the separator and then permeate by capillary absorption toward the middle of the separator (in the direction of its width) and also permeate laterally into the pore structure of the plates.

In addition to the enhanced ability of the special separator 16 of the invention to more uniformly distribute electrolyte during this filling operation, radial channels (not shown) may also be provided in the lower and/or upper surfaces of liners 20 and 30 to better achieve, in a more rapid manner, such distribution (see for more details U.S. Ser. No. 295,479 filed Aug. 21, 1981, now U.S. Pat. No. 4,421,832).

With the cell unsealed the plates may now be electrochemically formed in situ. In the case of the traditional flat plate prismatic battery, the formation can be done prior to sealing the lid to the jar container. However, in most constructions it is preferred to carry out the formation step after sealing the battery. In the case of the cylindrical element of FIGS. 2 and 3, sealing is effected by installing the elastic resealable safety valve 38, e.g. of the Bunsen type, over the vent hole 36. The sealed element may then optionally be inserted into an outer protective metal can 40, an outer plastic cosmetic top 42 installed over the inner lid 30 and terminals, and can 40 crimped around the edge of the cosmetic top to complete the assembly.

The positive and negative plates are now electrochemically formed (in situ) whereby the lead-containing materials of the unformed plates are converted into the electrochemically active lead dioxide in the positive and sponge lead in the negative plate. Any desired formation regime may be employed; however, use of constant current, stepped constant current or taper current as the electrical driving force 44 is preferred. The formation electrolyte also serves as the final cell electrolyte.

After formation individual pore volumes of the plates and separator are less than fully filled i.e., unsaturated with electrolyte. This has also been termed a "starved" electrolyte condition, providing homogeneously distributed thin film sites in the plates necessary for oxygen transport from the positive to the negative plate via the open channels in the interposed separator.

In accordance with the invention, choice of the separator materials 16 is critical as it is believed to enhance a more uniform distribution of electrolyte within the unformed (and formed) element, and to partition relatively more electrolyte into the pore volume of the plates. This is believed to result in a more complete formation of the plates and the development of a higher pore volume and/or increased surface area in the plates, more highly wetted with electrolyte, than heretofore realized with this type of process, all resulting in enhanced high rate discharge performance of the cell.

The separator of the invention is similar to separators previously used for sealed lead-acid batteries operating on the oxygen recombination principle, in particular separators formed of a highly porous mat of ultrafine glass fibers. Typically a mix of fibers may be employed whose individual fibers range in diameter from 0.2 to about 10 microns with possibly minor amounts of larger gauge fibers to facilitate production of the mat. The porosity must be high and in particular preferably from about 80 to about 98 and more preferably from about 85 to about 95 percent, in the compressed state in the cell (slightly higher in the uncompressed state). The separator also has a relatively high surface area which makes it possible to absorb and retain relatively large amounts of acid volumetrically and still have a substantial unfilled pore volume conducive to gas, i.e., oxygen transport directly through the separator for consumption at the negative electrode.

Whereas the commercially known cells produced by the in situ formation process employed an ultrafine glass fiber separator of this type and having a specific surface area between 2.0 and 2.4 $m^2/g$, and it was known from commonly assigned U.S. Pat. No. 3,862,861 to generally employ a surface area in the range of approximately 0.1 to 20 $m^2/g$, it has been found unexpectedly that use of a relatively lower surface area glass mat than heretofore employed, and within a specific narrow range, has resulted in the achievement of a much more favorable distribution and partitioning of the electrolyte between the plates and separator, an increase in the intrusion volume of the plates upon formation, and an unexpectedly substantial increase in discharge capacity of the cell at elevated discharge rates. Comparatively even greater enhanced discharge performance at low ambient temperatures have been achieved. The surface area of the ultrafine glass fibers of the separator mat which leads to such an enhancement is preferably from about 0.2 to about 1.7 $m^2/g$, more preferably from about 0.3 to about 1.5 $m^2/g$, and most preferably from about 0.3 to about 1.1 $m^2/g$. Surface area below 0.2 $m^2/g$ result in a separator that is difficult to handle with assembly equipment e.g., a winder, and also reduces the retention and absorption of the separator below that necessary for practical operation under the oxygen cycle. Surfaces exceeding about 1.7 $m^2/g$ do not show significant enhancement in high rate discharge performance over previously known separators having surface areas in the range of 2.0–2.4 $m^2/g$.

Even though the surface area is lowered in comparison with previously used ultrafine glass fiber mat separators in sealed cells, preferably the basis weight and caliper are maintained substantially the same so that the porosity is correspondingly high which enables the retention of sufficiently large volumes of acid for high capacity determination and maintenance of gas diffusion paths through the separator for enhanced oxygen recombination.

The lower surface area separator of the invention has been found to yield a more uniform acid distribution particularly at the mid portions of the plates (vertically in FIG. 3) within the cell, partially because the lower surface area separator has higher capillary (wicking height) and this effect becomes more critical as the cell height increases. In this manner, the previous problem with dry bands where localized areas of relatively lower specific gravity electrolyte occurred, particularly at the center of the cell, is believed to be avoided and corrosion rates are greatly curtailed. In general, it is preferred the separator material of the invention should have a capillarity rise or wicking height of at least about 65 mm when a 1×5 inch strip of the dry separator material is suspended vertically for 5 minutes above a body of aqueous sulfuric acid electrolyte of 1.335 specific gravity with 0.12 in. (3.2 mm) of the lower end of the separator strip immersed in the electrolyte after a steady state wicking condition has been reached at 23 degrees C. at a relative humidity of less than about 25 percent. The preceding conforms substantially to ASTM D202 test. With enhanced capillarity apparently the acid during the filling operation is able to wick into the portions of the cell pack remote from the location where the acid first enters or penetrates the cell pack e.g., the top and bottom. The acid is not so tenaciously held by the separator at the ends of the cell pack as in the case of the customarily employed higher surface area glass mats.

The invention will be further explained in reference to the following working examples.

EXAMPLE I

Five standard D size (2.5 A.H., 2.65 in. [67 mm] height, 1.34 in. [34 mm] diameter) cells corresponding in construction to FIG. 3 and commercially available Gates Energy Products, Inc. product number 0810-0004 were prepared generally in accordance with the foregoing specification. Positive paste comprised of litharge and red lead having a density of about 4.7 g/cm$^3$ and negative paste comprised of litharge having a density of about 4.5 g/cm$^3$ were machine pasted, respectively on pure lead grids 0.032 in. (0.81 mm) thick. Four layers of 0.012 in. (0.30 mm) thick standard 225B separator material (manufactured by Dexter Corporation, Windsor Locks, Conn.) was interleaved between the plates and wound into a spiral element in accordance with FIG. 2. Dexter 225B is formed of a mat of entangled fibers composed of 83 weight percent 0.5–0.75 micrometer ("micron") diameter glass fiber mixed with 11 weight percent 2.5–4.0 micron glass fiber and 6 weight percent 13 micron glass fiber, and has a measured BET surface area of 2.013 m$^2$/g and an average capillary rise (wicking height) of 56 mm. Its uncompressed porosity is about 92.5 percent, and its porosity in the final wound cell is about 90.5 percent (calculated) in the compressed state. After making connections through the inner lid, stuffing the element into the inner liner, and bonding the lid to the liner to reach the construction shown at 11 in FIG. 2, 1.335 s.g. sulfuric acid electrolyte in an amount insufficient to saturate the element was added under vacuum and then Bunsen valve 38 was installed, sealing the cell. The sealed element was then inserted in an outer metal can, an outer plastic top added and then the assembly crimped to produce the construction of FIG. 3. These cells were then laboratory formed (in situ) using step constant current. These cells are designated as controls in this example.

A second set of five cells was made indentically in construction, method of assembly and formation regime with the above controls, except a lower surface area glass mat was substituted for the conventional 225B. The substitute material was designated by its manufacturer, Evans Products Company of Corvallis, Oreg., as AGM 45N12, and had a porosity of about 85 to 95 percent, and a measured BET surface area of about 1.21 m$^2$/g. Two layers of 0.024 in. (0.61 mm) were used between the plates.

After formation, the respective cell groups were subjected to a high rate (10C) low temperature (−20° C.) discharge ("HRLT") to a 1.0 V cutoff. The control cells on this HRLT yielded an average discharge time of 67.2 seconds, while the cells of the invention using 45N12 separator yielded an average discharge time of 91.8 seconds. All cells were then recharged at 50 ma constant current for 65 hours and subsequently discharged at the 10C rate (25A) at room temperature (24° C.) to 1.0 V. The control cells averaged 124.6 seconds discharge and the cells of the invention 145 seconds.

All cells were subsequently recharged for 17 hours at 200 ma constant current, and a second (identical) HRLT run yielding an average 64.2 seconds discharge for the controls, and the cells of the invention averaging 90.6 seconds.

EXAMPLE II

The same comparison using the same procedure was made as in Example I with the first exception that the control cells employed two layers of double basis weight (0.024 in. [0.61 mm] thick) Dexter X8248 glass fiber separator having a measured BET surface area of 2.387 m$^2$/g, but in other respects substantially the same as grade 225B. The second difference was that the cells of the invention employed two layers of Dexter X8910 separator characterized as 0.024 in. (0.61 mm) thick each, having a capillary rise of 72 mm, and a measured BET surface area of 0.746 m$^2$/g, and a porosity of about 85 to about 95 percent. All cells were laboratory formed with a step constant current regime.

The three control cells yielded an average HRLT discharge time of 63 seconds for the first HRLT, 73.7 for the second HRLT, 83.3 for the third HRLT and 75.7 for the fourth and last HRLT. In comparison, the six cells of the invention using X8910 separator had successive average HRLT discharge times of 91.5 seconds, 90.6 seconds, 91.3 seconds and 81.2 seconds. Intervening recharges were the same for all cells.

EXAMPLE III

The same comparison was made as in Example I except three sets of D cells were compared. Eight control cells were used, each employing two layers of X8248 as in Example II, having a surface area of 2.387 m$^2$/g. The second set (6 cells), according to the invention, employed two layers of Dexter X8939 separator (0.024 in. [0.61 mm] thick per layer, having a capillary rise of 97 mm, a porosity of 85 to 95 percent, and a surface area of 1.006 m$^2$/g). The third set (6 cells), also according to the invention, used two layers of Evans AGM 40M10 separator (0.024 in. [0.61 mm] thick per layer, porosity of 88 to 95 percent and a surface area of 1.402 m$^2$/g).

The control cells yielded an average discharge time in seconds for four successive HRLT's (with intervening recharge) of: 40.5, 48.7, 65.7 and 72.4. Similarly, the second set, of X8939 cells yielded HRLT's of: 61.3, 73.2, 79.2 and 91.8 seconds. Likewise, the third set, of 40M10 cells gave HRLT's of: 71.2, 70.6, 91.8 and 102.2 seconds.

EXAMPLE IV

Similar to Example III, three sets of cells were compared. Six control cells were used, two having 4 layers of 0.012 in. (0.30 mm) thick 225B and four having two layers of X8248 separator. The second set (three cells) used X8939 separator, and the third set (6 cells) used four layers of Evans Adalard (U.K.) glass fiber mat separator, 0.012 in. (0.30 mm) thick, having a surface area of about 1.08 m$^2$/g, capillary rise of 79 mm, and a porosity of 85 to 95 percent. All cells were formed (sealed) using a stepped constant current regime.

The control cells yielded an average discharge time for five successive HRLT's (with intervening recharge) of: 58.8, 57.8, 76.0, 61.2 and 78.2 seconds. Similarly, the X8939 cells gave 64.7, 70.0, 88.3, 79 and 95.3 seconds. The Evans Adalard cells yielded 75.0, 82.2, 100.5, 90.2 and 106.0 seconds.

EXAMPLE V

In this example the effect of negative plate paste density was compared. Three sets of cells were compared, the first consisted of four control D cells prepared as in Example I except that the separator was composed of two layers of double basis weight X8248 glass mat (surface area 2.387 m$^2$/g). A second set of four control cells was identical with the first set except the negative plate paste was composed of a partially sulfated paste comprised of litharge and about 50 percent leady oxide, the balance expander and binder. The third set of four cells was the same as the second set of controls except, in accordance with the invention, the cells used lower surface area glass separator, namely Evans AGM 40M10 as in Example 3, two layers, 0.024 in. (0.61 mm) thick each, having a surface area of 1.402 m$^2$/g. All cells were formed (sealed) using a stepped constant current regime.

The first set of control cells yielded an average discharge time for four successive HRLT's (with intervening recharges) of: 19.25, 21.5, 54.0 and 77.5 seconds. Similarly, the second set of controls, with sulfated negative paste, yielded average HRLT's of: 59.75, 62.75, 56.5 and 69.75 seconds. The third set, using low surface area separator and sulfated negatives, yielded average HRLT's of: 73.0, 75.75, 85.25 and 100.5 seconds.

EXAMPLE VI

This experiment corresponds to Example I except that "X" size spiral wound cells (5.0 AH, 3.17 in. [81 mm] height, 1.74 in. [44 mm] diameter) were employed, the control cells (six) used two layers of X8248 separator between the plates, and the cells (six) of the invention used two layers of Dexter X8939 separator. Both overall separators had virtually the same thickness, basis weight, and porosity, differing primarily only in surface area. All cells were sealed and then formed using a stepped constant current regime.

The control cells and cells of the invention were successively subjected to two HRLT's, then a 60A (12C) room temperature discharge to 1.6 V and finally to 1.0 V then third, fourth and fifth HRTL's (with intervening recharges). The control cells yielded: 44.17, 44.33, 68.17 (to 1.6 V) and 93.83 (to 1.0 V), 67.5, 63.5 and 57.17 seconds. Similarly, the cells of the invention gave: 65.67, 68.50, 88.67 (to 1.6 V) and 107.17 (to 1.0 V), 90.33, 94.33 and 79.0 seconds.

EXAMPLE VII

An experiment similar to Example VI using X cells was conducted, using the same type X8248 controls compared against cells of the invention employing X8910 separator (Example II, 0.746 m$^2$/g). All cells used a step constant current formation. Total formation weight loss for the control cells was 2.82 g, for the cells of the invention 3.57 g.

All cells were then successively discharged (with intervening recharge) at 12C (60A) to 1.0 V, one HRLT (10C/−20° C.) to 1.0 V, a 0.6C (3A) discharge to 1.75 V and finally a C/5 (1A) discharge to 1.6 V.

The control cells yielded, respectively: 97.6 seconds, 47.0 seconds, 85.8 minutes and 4.80 hours. Similarly, the X8910 cells of the invention gave: 119.7 seconds, 74.2 seconds, 87.1 minutes and 5.27 hours.

EXAMPLE VIII

This example also corresponds to Example I except that (larger) "BC" size spiral wound cells (25.0AH, 6.78 in. [172 mm] height, 2.55 in. [65 mm] diameter) were employed, the four control cells used four layers of Dexter 225B separator and the cells of the invention used two layers of Evans AGM 40M12 separator (similar to 40M10 of Example III, except about 15 percent higher basis weight, and a surface area of 1.512 m$^2$/g). All cells were lab formed at constant current.

Two successive HRLT's were run. The control cells gave an average 12.5 seconds on the first, 29.25 seconds on the second. The cells of the invention yielded an average 25.5 seconds on the first HRLT, 48.0 on the second.

EXAMPLE IX

This example compares BC cells as in Example VIII, except the control cells used two layers of standard X8248 separator, and the cells of the invention used two layers of X8910 separator. Both separators had substantially the same caliper thickness, basis weight and porosity, differing only in specific surface area. Each cell was filled with 1.335 s.g. sulfuric acid electrolyte, and formed (sealed) at stepped constant current.

Both cell groups were successively discharged (with intervening recharges) at 300A (12C) ambient temperature, then at 250A (10C) ambient, and then at 250A, −21° C. (HRLT). The control cells yielded on the average: 48.6, 74.4 and 23.0 seconds. The X8910 cells of the invention gave: 91.2, 121.7 and 54.2 seconds.

The acid distribution was measured after formation in the positive plates and separators of the cells. The controls had about 240.0 milliequivalents of acid in the positive plate versus 285.3 milliequivalents of acid for the X8910 cells. The controls had 1746 milliequivalents of acid in the separator compared to 1467 for the X8910 cells. No measurements were made of the negative plate.

EXAMPLE X

Four flat plate prismatic sealed lead-acid cell configurations (six of each) were constructed for comparison. All cells contained 10 negative and 9 positive plates, 3.55 in. (90.17 mm) by 3.55 in. (90.17 mm). The positive plates were 0.035 in. (0.89 mm) thick and the negative plates 0.030 in. (0.76 mm) thick. The two control cell types employed one layer of 3½ basis weight Dexter X8504 separator (same type as 225B), having a porosity of about 90 percent and a surface area of about 2.20 m$^2$/g, compressed between the unformed plates. Both control cell types used standard positive plate paste as in Example I. The first control cell used the same high density negative plate paste as in Example I, and the second control cell used a sulfated leady oxide paste as described in Example V.

The first cell type of the invention was constructed the same as the first control cell type except it used two layers of Evans AGM 40M12 (0.024 in. [0.61 mm] thickness per layer, 1.512 m$^2$/g between plates. Likewise, the second cell type of the invention was constructed the same as the second control cell type with the exception that two layers of the 40M12 glass separator was used in place of the normal high surface area glass separator.

All cells were filled with 1.300 s.g. acid, then sealed and then formed in situ at constant current.

Three of the control cells and three of the cells of the invention all of the first type (high density negative paste) were each subjected at ambient temperature to three 18A discharges (to 1.75 V) and then a 240A discharge at 0° C. (to 1.33 V), with intervening recharge. The control cells yielded an average 38 minutes on the 18A discharge and 46 seconds on the 240A discharge. The cells of the invention averaged 45 minutes and 73 seconds, respectively.

The remaining three control cells and cells of the invention of the first type were subjected to five C/5 discharges (to 1.6 V) followed by an HRLT, with intervening recharge. The control cells gave an average 3.47 hours on the C/5 discharge and 29 seconds for the HRLT compared with 3.92 hours and 53 seconds, respectively, for the cells of the invention.

Three of the control cells and three of the cells of the invention all of the second type (sulfated negative paste) were each subjected to three 18A discharges at ambient temperature and then a 240A discharge at 0° C. The control cells and cells of the invention each yielded an average 58 minutes on the 18A discharge. On the 240A discharge the control ran 83 seconds and the cell of the invention yielded 99 seconds.

The remaining three control cells and cells of the invention of the second type were subjected to five C/5 discharges followed by an HRLT as above. The control cells gave an average 4.82 hours on the C/5 discharge and 47 seconds on the HRLT, whereas the cells of the invention yielded 4.68 hours and 69 seconds, respectively.

EXAMPLE XI

In this example two sets of D size cells are compared, the first set being sealed with bunsen valves (30–50 psi release pressure) during formation as in previous examples, and the second set being open to the atmosphere (holes provided in the bunsen valves) during formation and sealed after completion of formation.

Each set was composed of six cells, two each respectively employing the aforementioned X8910 and X8939 separator according to the invention, and two control cells using X8248 separator. Sulfuric acid of 1.335 s.g. and stepped constant current formation was used.

The weight loss on formation for all sealed-formed cells was substantially the same, averaging 0.76 g. The open-formed cells had an average weight loss of 1.37 g.

Six successive HRLT's were run. For the sealed-formed cells the X8910 cells yielded an average discharge time of 76, 80, 86.5, 82, 77 and 91 seconds; the X8939 cells 63, 69.5, 68.5, 79, 78 and 87 seconds; and the X8248 controls 48, 63, 58, 73, 67.5 and 72 seconds.

For the open-formed set the X8910 cells gave an average discharge time of 96.5, 82, 87.5, 89.5, 85.5 and 95 seconds; the X8939 cells 72.5, 74, 72, 81, 85.5 and 90.5 seconds; and the X8248 controls 55, 64.5, 69.5, 78, 72 and 79.5 seconds.

The significance of improved high rate, low temperature discharge times is well appreciated by those skilled in the art. The high rate, low temperature discharge test simulates battery output for engine starting and the like in cold weather, such as encountered when internal combustion or diesel engines are started with the aid of starting, lighting and ignition (SLI) batteries in cold climates.

While certain representative embodiments and details have been shown for the purpose of illustrating the invention, it will be apparent to those skilled in this art that various changes and modifications may be made therein without departing from the spirit or scope of the invention.

What is claimed is:

1. A method for producing a normally sealed gas recombining lead-acid electrochemical cell having absorbed electrolyte, comprising:

assembling a cell stack of electrochemically unformed lead-containing plates and interleaved highly porous microfine glass fiber separator having a surface area of from about 0.2 to about 1.5 $m^2/g$ as determined by the BET method;

inserting the cell stack into a container so that the unformed plates and separator are mutually pressed together;

metering a controlled quantity of acid electrolyte into the cell so that the electrolyte is substantially fully absorbed in the pores of the plates and separator;

electrochemically forming the plates of the cell in situ, whereby individual pore volumes of the plates and separator are less than fully filled with electrolyte; and prior to or after this forming step sealing the cell.

2. The method of claim 1 wherein the quantity of electrolyte metered into the cell contains from about 4.2 to about 5.8 g of sulfuric acid per ampere-hour capacity of the cell.

3. The method of claim 1 wherein the glass fiber separator has a surface area of from about 0.3 to about 1.5 $m^2/g$.

4. The method of claim 1 wherein the separator has a porosity of from about 85 to about 95 percent and an electrolyte wicking height of at least about 65 mm.

5. A method for producing a normally sealed oxygen recombining lead-acid electrochemical cell of the absorbed electrolyte type capable of high rate discharge, comprising:

assembling a cell stack of electrochemically unformed lead-containing plates and interleaved highly porous microfine glass fiber separator having a surface area of from about 0.2 to about 1.5 $m^2/g$ as determined by the BET method;

inserting the cell stack into a container so that the unformed plates and separator are mutually pressed together;

metering a controlled quantity of acid electrolyte into the cell so that the electrolyte is substantially fully absorbed in the pores of the plates and separator;

sealing the cell with a resealable valve adapted to open (vent) at a desired superatmospheric internal pressure; and thereafter electrochemically forming the plates of the cell in situ, whereby individual pore volumes of the plates and separator are less than fully filled with electrolyte.

6. A method for producing a normally sealed wound oxygen recombining electrochemical cell having absorbed electrolyte, comprising:

pasting a continuous length of pliable lead grid with positive lead-containing paste (which when formed converts to lead dioxide), to form a positive pasted plate;

pasting a continuous length of pliable lead grid with sulfated negative paste comprising leady oxide (which when formed converts to sponge lead), to form a negative pasted plate;

interposing microfine glass fiber mat separator having a surface area of from about 0.2 to about 1.5 $m^2/g$ as determined by the BET method between the positive and negative pasted plates;

winding the pasted plates and interposed separator into a unitary cell stack;

inserting the cell stack into a container so that the unformed positive pasted plate and unformed negative pasted plate and separator are mutually pressed together;

metering a controlled quantity of acid electrolyte into the cell so that the electrolyte is substantially fully absorbed in the pores of the plates and separator;

electrochemically forming the plates of the cell in situ, whereby individual pore volumes of the plates and separator are less than fully filled with electrolyte; and prior to or after this forming step sealing the cell.

7. The method of claim 6 wherein the quantity of electrolyte metered into the cell contains from about 4.2 to about 5.8 g of sulfuric acid per ampere-hour capacity of the cell.

8. The method of claim 6 wherein the glass fiber separator has a surface area of from about 0.3 to about 1.5 $m^2/g$.

9. The method of claim 6 wherein the separator has a porosity of from about 80 to about 95 percent and an electrolyte capillary rise (wicking height) of at least about 65 mm.

10. The method of claim 6 wherein the positive paste is a sulfated paste comprising leady oxide.

11. The method of claim 6 wherein the glass fiber separator has a surface area of from about 0.3 to about 1.1 $m^2/g$.

12. A method for producing a normally sealed gas recombining lead-acid electrochemical cell having absorbed electrolyte, comprising:

assembling a cell stack of electrochemically unformed positive and negative lead-containing plates and interleaved highly porous microfine glass fiber separator having a surface area of from about 0.7 to about 1.5 $m^2/g$ as determined by the BET method;

inserting the cell stack into a container so that the unformed plates and separator are mutually pressed together;

metering a controlled quantity of acid electrolyte into the cell so that electrolyte is absorbed in the pores of the plates and separator;

electrochemically forming the plates of the cell in situ, whereby the pore volume of the cell stack of formed plates and separator is less than fully filled with electrolyte; and prior to or after this forming step, sealing the cell.

13. The method of claim 12 wherein the separator has a porosity of from about 85% to about 95%, and an electrolyte wicking height of at least about 65 mm when a 1×5 inch strip of the dry separator material is suspended vertically for 5 minutes above a body of aqueous sulfuric acid electrolyte of 1.335 specific gravity with 0.012 in. (3.2 mm) of the lower end of the separator strip immersed in the electrolyte after a steady state wicking condition has been reached at 23 degrees C. at a relative humidity of less than about 25 percent.

14. The method of claim 12 wherein each of the positive and negative plates are composed of continuous length grids of high hydrogen overvoltage, pasted with electrochemically active material, and the positive and negative plates and interposed separator are wound or folded together as a unitary cell stack.

15. The method of claim 1 wherein the surface area is from about 0.7 to about 1.5 $m^2/g$.

16. The method of claim 5 wherein the surface area is from 0.7 to 1.5 $m^2/g$.

17. The method of claim 6 wherein the surface area is from 0.7 to 1.5 $m^2/g$.

* * * * *